(12) United States Patent
Glaesener et al.

(10) Patent No.: US 7,753,668 B2
(45) Date of Patent: Jul. 13, 2010

(54) PLATEN ASSEMBLY, MOLDING SYSTEM AND METHOD FOR PLATEN ORIENTATION AND ALIGNMENT

(75) Inventors: Pierre Glaesener, Bissen (LU); Ruud Luijs, Luxembourg (LU)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 185 days.

(21) Appl. No.: 11/626,398

(22) Filed: Jan. 24, 2007

(65) Prior Publication Data

US 2008/0174038 A1 Jul. 24, 2008

(51) Int. Cl.
*B28B 17/00* (2006.01)
*B29C 47/92* (2006.01)

(52) U.S. Cl. .................. 425/138; 425/135; 425/150; 425/167; 425/168; 425/DIG. 10; 264/40.5

(58) Field of Classification Search .............. 425/138, 425/150, 167, 168
See application file for complete search history.

(56) References Cited

U.S. PATENT DOCUMENTS

| | | | |
|---|---|---|---|
| 5,314,327 A | 5/1994 | Stein | |
| 5,338,171 A | 8/1994 | Hayakawa et al. | |
| 5,454,709 A | 10/1995 | Leonhartsberger et al. | |
| 5,593,711 A * | 1/1997 | Glaesener | 425/595 |
| 5,800,843 A * | 9/1998 | Kappelmuller et al. | 425/150 |
| 6,089,850 A * | 7/2000 | Dreier | 425/150 |
| 7,241,133 B2 * | 7/2007 | Wang | 425/575 |
| 2001/0051193 A1 | 12/2001 | Lichtinger | |
| 2003/0082270 A1 | 5/2003 | Lichtinger | |
| 2004/0012122 A1 * | 1/2004 | Nagaoka et al. | 264/328.7 |
| 2005/0170038 A1 | 8/2005 | Koike et al. | |

FOREIGN PATENT DOCUMENTS

JP 61261017 A * 11/1986

OTHER PUBLICATIONS

Rosato, D.V., D.V. Rosato, and M.G. Rosato, Injection Molding Handbook (3rd Edition), 2000, Springer-Verlag, pp. 59-63.*

* cited by examiner

*Primary Examiner*—Richard Crispino
*Assistant Examiner*—William P Bell
(74) *Attorney, Agent, or Firm*—Husky Intellectual Property Services (57) ABSTRACT

A system in which gravitation and inertial effects on platen verticality and sagging are compensated by an anti-tilt actuator (68, 70). A hydraulic actuator (68, 70) secured beneath the platen is either set to offset only gravitationally-related sagging of the mold half (60, 62) by providing a compensating upward force (relative to a stable clamp base 80), or otherwise its upward force can be dynamically adjusted also to compensate for swaying or tilting of the mold-platen assembly caused by stroke cylinder (98) operation and related inertia/momentum effects. Preferably, a level sensor (94) measures and communicates a degree of horizontalness/verticality of the platen (48, 50) to a machine controller (88) which, in turn, generates a control signal (87) to cause variation in cylinder pressure in the anti-tilt actuator (68, 70), thereby achieving substantially continuous alignment between the mold halves (60, 62) and reduced component wear.

17 Claims, 6 Drawing Sheets

PLATEN ASSEMBLY, MOLDING SYSTEM AND METHOD FOR PLATEN ORIENTATION AND ALIGNMENT

FIELD OF THE INVENTION

This invention relates, in general, to a platen onto which is mounted (within a molding machine environment) a mold. More particularly, but not exclusively, the present invention relates to a mechanism for platen alignment and orientation and to an ability to compensate for platen tilting caused by different mold masses and/or the application of dynamically varying mold stroke forces during clamping cycles.

SUMMARY OF THE PRIOR ART

During the course of the life of an injection molding machine, it is not unreasonable to assume that the machine will be used to produce many different products from multiple different molds having different mold masses. Each mold contains a hot half and a cold half, with these complementary mold halves installed opposite each other on either a stationary platen and a moving platen. In order to permit the effective molding of parts, it is necessary for these mold halves to be securely attached to the platens and accurately aligned with each other. Where alignment is poor, there is excessive mold wear during mold closing and mold flash can occur during injection (which results in re-work or rejection of the molded parts). Furthermore, the flashed material, if left on the mold sealing surfaces, can cause or otherwise exacerbate mold wear.

By their very nature and function and as a consequence of the high pressure molding environments in which they operate, molds are materially and structurally massive. Particularly in large tonnage application, each mold can weigh many tens of tons. The skilled person will appreciate that large tonnage applications can generally be considered as requiring clamp tonnages of approximately 1000 tons and typically more than 1500 tons of clamp force).

When such a heavy mold is mounted to a platen, the centre of gravity of the entire composite assembly shifts because the overhanging nature of the mold half alters the distribution of mass (relative to the mold mounting face and the platen on its own) and thus induces a bending (and more particularly a tilting) moment into the composite assembly. This bending moment causes the entire mold-platen assembly to tilt forward, with this effect occurring in both the stationary and moving platens. Consequently, when the mold is closed, the resultant tilting or sagging produces a fundamental misalignment between the mold halves. This misalignment causes mold wear and has a detrimental effect on part quality, as previously described.

In the case of the moving platen, the rear wall may be integrally formed with a laterally extending foot extension that provides a relatively wide base. The foot extension extends from the back of the rear wall to a position (typically) beneath or in front of any mounted mold half coupled to the front wall. The permanent connection point of the rear wall to the foot extension produces a pivot about which the moment of inertia acts. Even when the foot extension is significant (in terms of overall length), the weight of the mold not only has the effect of causing a shifting of the mold downwardly, but it also induces tilting and misalignment of the front mold mounting face. Furthermore, the momentum associated with moving a heavy mass effectively increases/decreases the effective bending moment, thereby causing the platen to experience some perturbation (especially visible at the top of the platen).

Functionally speaking, the foot extension provides an anti-topple mechanism because of the effective distribution of load and the fact that the centre of gravity of the composite platen and mold assembly acts through the foot extension.

On the other side, the stationary platen includes a relatively short support base since this base is permanently coupled to the clamp base and thus the clamp base provides a degree of stability. However, any overhanging mass of the mold half has the detrimental effects of: i) causing the mold to drop under its own weight and particularly the action of shear stresses; and ii) varying the effective centre of gravity for the combined mold and platen assembly to cause sagging/tilting (from the resultant bending moment) of the combined platen-mold assembly. The net result is, again, mold half misalignment and non-parallel mold half closure.

Box-structure designs have no free-floating front face and are less effective in preventing platen deflection under applied clamp tonnage. However, the use of heavyweight molds (that could have masses in excess of 80 tons) still induces tilting or bending of the platen and thus misalignment between the mold halves.

Simple solutions to inhibit or prevent tilting include increasing the stiffness of the base or adding additional weight to the platen to effectively counter-balance the overhanging weight of a heavy mold. Unfortunately, while these are alternative solutions, the increase in steel material significantly increases overall raw material costs for the platen. Additionally, to maintain cycle time performance, the resultant clamp unit would need to include a higher technical specification because of the need to control the movement of increased mass. An increased technical specification also leads to an overall cost increase.

Molding machines can be generally categorised as either being two-platen or three-platen machines.

In a three-platen environment, tie-bars permanently couple the stationary platen to the tail stock platen, while a moving platen is located therebetween. Mold stroke force is then developed centrally (typically through the use of a toggle mechanism or a hydraulically-actuated central column) along the main access through the machine. Therefore, in a three-platen machine, rigidity of the system is ensured through the permanent end connections (and permanently closed force path) of the tie-bars to the stationary platen and the tail stock platen. Sometimes, the tail stock platen is known by the interchangeable term "end platen" or "end plate" or "clamp platen".

In a two platen design, however, the moving platen is selectively coupled to the stationary platen through the selective positive engagement of the tie-bars. Specifically, while the tie-bars are permanently coupled to the corners of the stationary platen, tie-bar clamp units, located in the corners of the moving platen, are used to engage and release the tie-bars to permit mold opening and mold closing. Stroke cylinders are conventionally used to affect opening and closing of the mold, with the stroke cylinders therefore producing positive acceleration of the moving platen in both directions of the main axis of the machine. With this mold acceleration and deceleration, a tilting force is again experienced by the stationary platen and its mold half. This tilting force arises from inertia of the combined platen and its mold. The resultant tilting of the stationary platen produces additional misalignment that places strains on components that are within the mold. For example, the misalignment causes damage to cores or leader pins during the opening of the mold and which extend outwardly from one or both of the mold halves. Damage caused to such cores or leader pins can prevent effective mold alignment with the effect that the mold (or a specific cavity within the mold) begins to exude flash or otherwise to wear prematurely. As will be understood, leader pins are accurately machined, tightly toleranced steel bars that engage within and align mold plates and mold halves, whereas cores are integral parts of the mold and define surface detail or features in the molded part.

The prior art has attempted to address some superficial aspects of mold misalignment.

For example, U.S. Pat. No. 5,314,327 (assigned to Hemscheidt Maschinentechnik Schwerin GmbH) permits a mold to be correctly set-up, i.e. aligned, through the provision of adjustable guide rollers of the moving platen, which guide rollers are supported on the machine frame. Raising or lowering of either a front spindle or a back spindle (respectively associated with front and back guide rollers) causes inclination of the entire platen in either backwards or forwards direction.

U.S. patent application 2005/0170038 to Koike et al describes an alignment compensation mechanism that prevents a die support member from misaligning under clamp-up conditions. The die support, acting as a shoe, is located on a moveable carriage which, in turn, runs along linear bearings affixed to a clamp base. The provision of a first elastic mechanism (i.e. a spring) permits the die support member to lift off from the carriage, thereby preventing the carriage from experiencing misalignment as a consequence of platen deflection. A second elastic mechanism (i.e. a laterally located second spring coupled between an edge of the die support and an end of the carriage) functions to permit movement of the die support member during clamp up (when mold deflection occurs). The second spring therefore avoids load from being exerted on the carriage (and associated drive).

U.S. Pat. No. 5,454,709 to Leonhartsberger et al provides an adjustment nut that permits. during initial set-up, the foot of the stationary platen to be straightened (relative to the frame of the clamp unit). A roller, located beneath and at the end of a running shoe supporting the moving platen, permits the height of the moving platen to be adjusted, at set-up, to supposedly ensure alignment with the stationary platen.

U.S. Pat. No. 5,338,171 describes a system that provides height compensation for the moving platen only. A roller, located beneath the foot of the moving platen and riding along clamp bed, is hydraulically adjustable to permit the height of the mold half on the moving platen to be adjusted relative to the stationary platen. Twisting or tilting of the platen cannot, however, be addressed by merely adjusting the height of the moving platen.

The prior art is generally unable to address inertia problems and, furthermore, is applicable to set-up conditions only. Also, the prior art does not address for tilting of the platen that arises from the mounting of heavy molds, but rather just looks to provide basic mold half alignment through rudimentary level control of the platen at set-up.

SUMMARY OF THE INVENTION

According to the invention there is provided a platen assembly for use in a molding machine, the platen assembly comprising: a) a platen having a front face arranged to mount, in use, a mold half thereon to produce, in an operational environment, a mold-platen sub-assembly that is potentially affected by sagging and tilting related to at least one of an overall mass thereof, its centre of gravity, inertia effects arising from movement of the mold-platen sub-assembly and a structural configuration of the platen; and b) an anti-tilt apparatus coupled to the platen, the anti-tilt apparatus having: an actuator controllable in response to at least one of: i) a measured inclination of the platen; and ii) a tilting moment acting on the platen; the actuator generating a compensating up-lift that acts to substantially horizontally align the mold-platen sub-assembly by compensating for sagging and bending effects caused by at least one of the overall mass, the centre of gravity, the inertia effects arising from movement of the mold-platen sub-assembly and the structural configuration of the platen.

In another aspect of the present invention there is provided a molding system comprising: a clamp base; a clamp unit located on the clamp base and including at least one platen mounted thereon, the platen having mounted thereon a mold half; and an anti-tilt apparatus coupled to the platen, the anti-tilt apparatus having: an actuator controllable in response to at least one of a measured inclination of the platen and a tilting moment associated with the platen, the actuator generating a compensating up-lift that acts to substantially horizontally align the platen by compensating for sagging and bending effects caused by at least one of: i) an overall mass of the platen and mold; ii) a centre of gravity for the platen and mold; iii) inertia effects arising from movement of the platen; and iv) structural configuration of the platen.

In a preferred embodiment, the anti-tilt apparatus functions to provide automatic correction to changes in alignment of the mold halves arising from sagging and tilting events.

In another particular embodiment, the system includes stroke cylinders coupled to the platen and the clamp unit, the stroke cylinders arranged to affect selective opening and closing of the mold halves, wherein the anti-tilt apparatus functions to provide automatic correction to instantaneous changes in alignment of the mold halves arising from forces applied by the stroke cylinders.

In yet another aspect of the present invention there is provided a method of platen orientation and alignment in a machine environment where the platen supports a mold half, the method comprising: evaluating an alignment of the mold half and platen; and generating and applying to the platen an up-lift force to compensate for any tilting or sagging effect.

Advantageously, the present invention provides improved alignment of complementary molds halves mounted on respective platens. Moreover, the present invention provides a platen anti-tilting mechanism that compensates for mold weight and mold overhang and which mechanism can be applied both to the moving and stationary platens. The present invention, furthermore, finds particular utility with platen designs in which the front face of the platen is free-floating since the present invention beneficially improves mold alignment without significantly adding to the weight of the overall platen design.

Additionally, a preferred embodiment of the present invention is adaptive and can compensate for platen tilting caused by a mold stroke forces. In this way, this particular embodiment improves alignment of both mold and related mold components (e.g. cores and leader pins) throughout the entire cycle and therefore reduces the amount of wear experienced by the mold and its related components. With decreased wear and increased alignment, the present invention therefore extends the potential working life of the mold/clamp unit assembly and reduces servicing and maintenance costs.

BRIEF DESCRIPTION OF THE DRAWINGS

Embodiments of the invention will be described, by way of example only, with reference to the drawings, in which.

DETAILED DESCRIPTION OF THE PREFERRED EMBODIMENT

Figure 1:
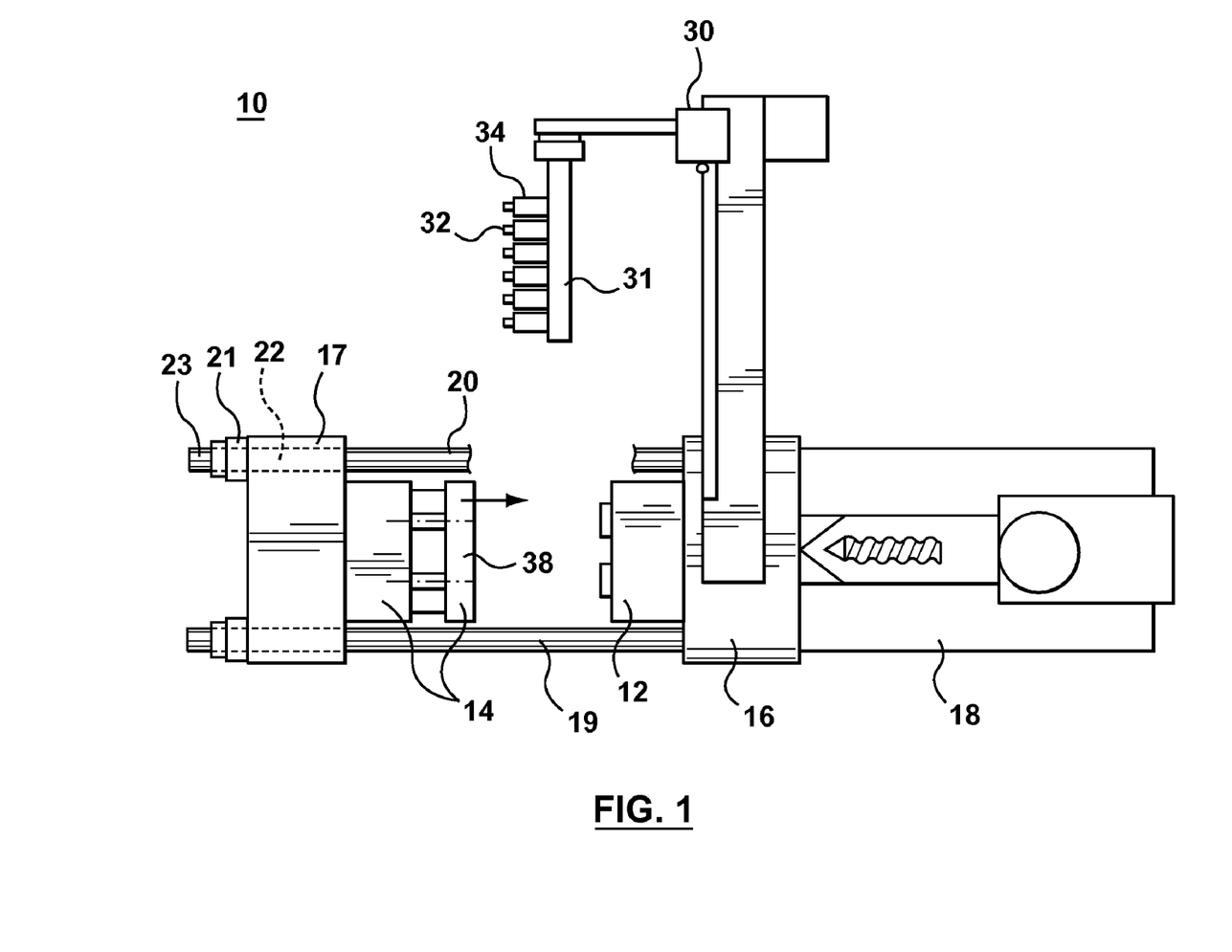
FIG. 1 is a schematic representation of a typical injection molding machine into which the present invention can be incorporated.

FIG. 1 shows a typical injection molding machine 10 that can be adaptable to support platen anti-tilt mechanism according to the various embodiments of the present invention.

Like conventional machines, during each injection cycle, the molding machine 10 produces a number of plastic parts corresponding to a mold cavity or cavities defined by complementary mold halves 12, 14 located within the machine 10.

Since platen tilting is particularly problematic with heavy molds with large overhanging regions (extending outwardly of the mold mounting faces), the molding machine can be considered (for reasons of explanation only and without limitation) to be a large tonnage molding machine supporting a mold that is in excess of 20 tons and more typically a mold having a mass in the region of between about 40 tons to 100 tons.

FIG. 1 is shown for exemplary purposes as a two-platen system, although it could be a three-platen system or a molding system containing a centre-section carrier. Three-platen systems, however, use the central column as the stroke mechanism, this circumventing the use of stroke cylinders.

The injection-molding machine 10 includes, without specific limitation, molding structure, such as a fixed platen 16 and a movable platen 17 as well as an injection unit 18 for plasticizing and injecting material. In operation, the movable platen 17 is moved relative to the fixed platen 16 by means of stroke cylinders (not shown) or the like. Clamp force is developed in the machine, as will readily be appreciated, through the use of tie-bars 19, 20 and a tie-bar clamping mechanism 21. The clamping mechanism 21 is (generally) fixedly attached to the moving platen 17 (typically through the use of bolts), with each clamping mechanism usually extending at least partially into a corresponding bore 22 that extends through the platen at the corners thereof. It is usual that a floating end 23 of the tie-bar 19, 20 is free to move relative to the moving platen, with the other remote end anchored into the stationary platen. Of course, in certain systems, the reverse anchoring methodology may be applied. Once the tie-bar is positively engaged in its respective clamp piston, mold clamp force (i.e. closure tonnage) can be applied through the use of (typically) a hydraulic system that is usually directly associated with the clamp piston.

The mold halves 12, 14 together constitute a mold generally having one or more mold cavities, with the mold halves 12, 14 each located in one of the movable platen 17 and the fixed platen 16. The mold halves will, as usual, include projections (such as leader pin alignment columns) that must be aligned and interconnected accurately to avoid wear and to produce commercially acceptable parts. Since these components merely benefit from the invention but do not relate to the implementation of the solution offered by the various embodiments of the present invention, specific detailing within the drawings has been omitted for reasons of clarity.

A robot 30 is provided, adjacent the fixed platen 16 and movable platen 17, to carry an end of arm tool (EOAT) 31, such as a vacuum-based take-out plate or a suction de-molding device or the like, that de-molds injection molded products 32. In the particular realisation of a take-out plate for preforms 32, the take-out plate contains a number of cooling tubes 34 at least corresponding in number to the number of preforms 32 produced in each injection cycle. For large tonnage application, the robot 30 is typically mounted directly onto and above the stationary platen 16 and will operate to remove one or a couple of molded products each cycle.

In use, in a mold open position (as shown in FIG. 1), the robot 30 moves the EOAT 31 into alignment with, typically, a core side of the mold and receives a molded article(s), e.g. a car bumper of multiple parts, that is stripped or otherwise ejected or vacuum-extracted from the core(s). A stripper plate 38 or its functional equivalent (e.g. actuators or lift rods) may be used to facilitate release of the molded article/part from the core.

Figure 2:
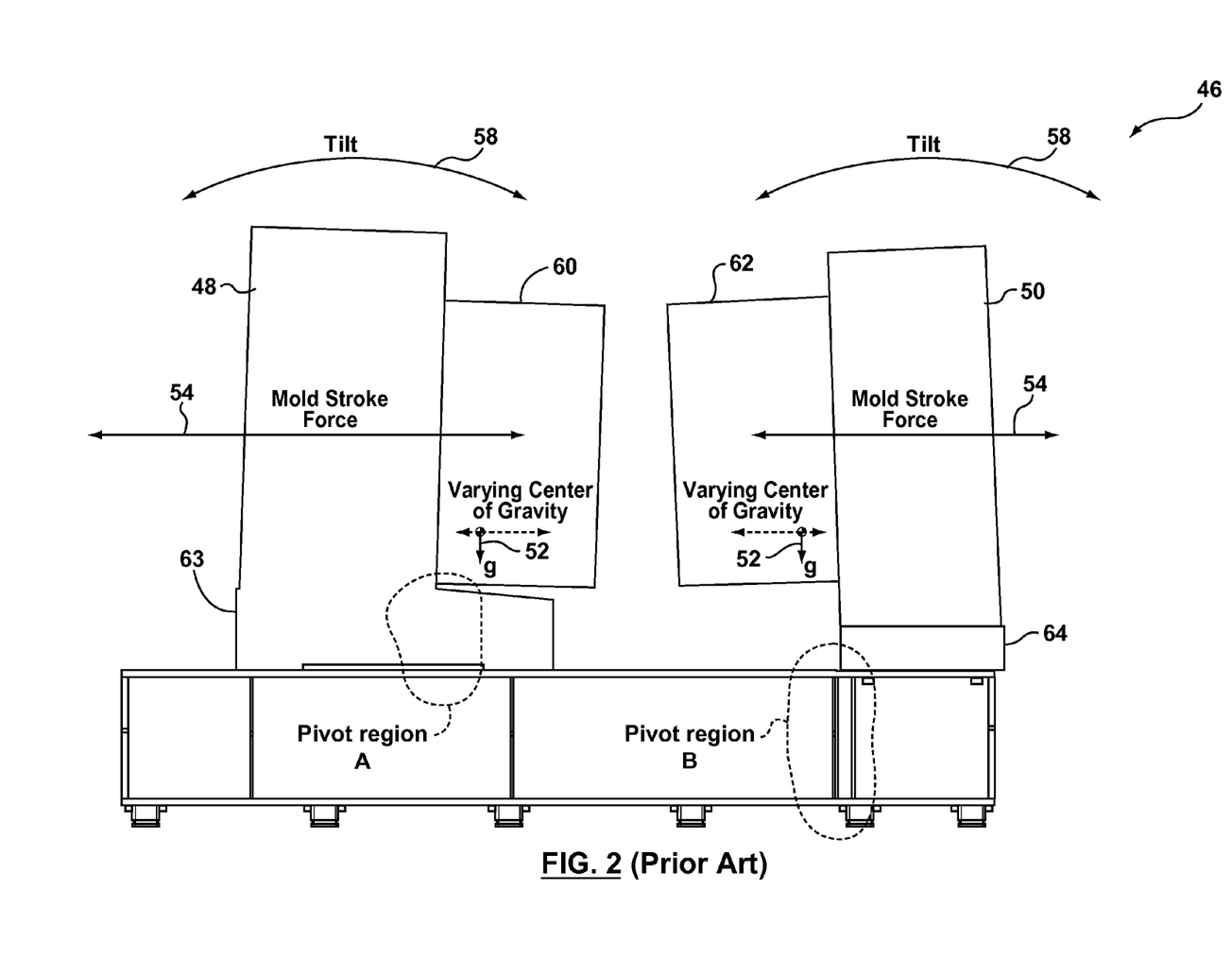
FIG. 2 is a schematic representation of prior art clamp unit including platens, the representation diagrammatically illustrating gravitational force and mold stroke forces that induce sagging and tilting.

With respect to FIG. 2, there is shown a schematic representation of prior art clamp unit 46 including a moving platen 48 and a stationary platen 50. The representation diagrammatically illustrates gravitational (g) force 52 and mold stroke forces 54 that cause: i) sagging/shearing effects; and ii) tilting effects 58 (shown by the inclination of the platens relative to horizontal). The shearing effect is essentially represented by the arrow associated with gravity (g). In relation to the stationary platen, tilting 58 occurs in both directions (both forwards and backwards) because of: i) the variable weights of each of the mold halves cause the platen to experience a bending moment (BM) at its pivotal anchor region (A, B) located at the moving platen leg or base; and ii) mold stroke forces 54 (developed by stroke cylinders shown in FIG. 3) that generally act through the centre line of the machine. For the moving platen, tilting is more restricted, as is shown in FIG. 2 and as will be understood by the skilled addressee. In terms of stroke forces, it will be understood that, conventionally, stroking of the mold is performed by a symmetrical array of stroke cylinders whose operational net effect is to separate the mold halves. With the effects of inertia, acceleration (either positive or negative) and related reaction forces (particularly against the stationary platen), the platen/mold assemblies each experience a tilting effect. This swaying/tilting causes instantaneous misalignment between the mold halves that results in the undesirable wearing effect described above.

Even in the case of a conventional box section platen, such a platen would still experience both tilting from operation of the stoke cylinders and sagging from the bending moment associated with the weight and location of the mold/centre of gravity.

Figure 3:
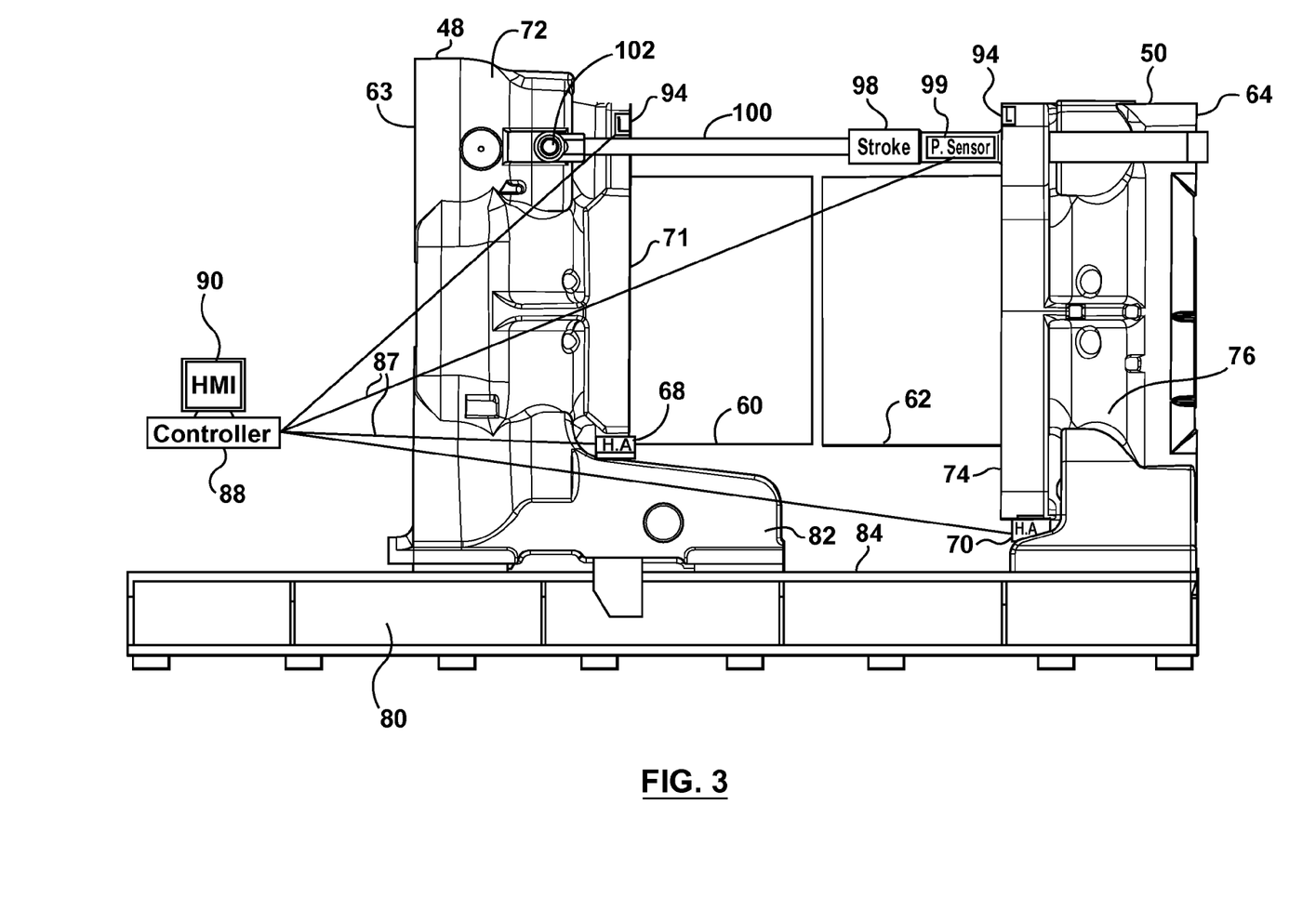
FIG. 3 is a schematic representation of clamp unit assembly including the anti-tilt apparatus of a preferred embodiment of the present invention.

FIG. 3 is a schematic representation of clamp unit assembly including anti-tilt apparatus 68, 70 of the present invention. The Reflex® moving platen 48 has its rear wall 63 connected to a front wall 71 through a cone-shaped intermediate support structure 72 having a relatively wide end connected to the rear wall 63. Mounted to the front wall 71 is mold half 60. Similarly, the Reflex® stationary platen 50 has its rear wall 64 connected to a face of a front wall 74 through a cone-shaped intermediate support structure 76 having a relatively wide end connected to the rear wall 64. The anti-tilt apparatus 68, 70 is effectively located beneath the front walls 71, 74. Preferably, the anti-tilt apparatus 68, 70 is mechanically coupled to a lower surface of the front face, but equally it could be coupled to a side face of the front wall. A second end of the anti-tilt apparatus is coupled to either the floor/level ground 126 or effectively to a mechanically solid structure, e.g. clamp base 80 of clamp unit 46 or a foot extension 82 typically coupled to the rear wall 63 of the platen. For completeness, it is noted that the foot extension 82 of the moving platen includes bronze shoes that ride on steel slide bands 84 located on the clamp base 80.

The anti-tilt apparatus 68, 70 is operationally responsive to control signals 87 communicated to or received from a machine controller 88 (that preferably includes a human machine interface, HMI, 90). The control signals 87 may be communicated over any suitable communication link, including cabling or radio frequency links. A preferred configuration of the anti-tilt apparatus 68, 70 will be described subsequently in relation to FIG. 4, but it is initially sufficient to say that the anti-tilt apparatus 68, 70 may be realised by a hydraulic actuator (or the like) that is controlled in responsive to a measured horizontal alignment/inclination of the platen-mold assembly or to a variation in tilting moment as applied by the stroke cylinder.

An inclination or measured horizontal alignment is determined, for example, by a level sensor 94 (in signalling communication with the machine controller 88) located, for example, on the front wall 71 of the moving platen. The level sensor 94 could also be located in other parts of the system, including the mold half or elsewhere on the platen. It is preferred that at the system employs at least one level sensor (e.g. ZEROTRONIC high precision, fully digitized electronic inclination measuring sensors manufactured WYLER AG) and that level sensors are located on both the moving and stationary platens. Alternatively, other measures or approximations of alignment or tilting may be taken or made (as readily appreciated by the skilled addressee) based to control the anti-tilt apparatus 68, 70.

FIG. 3 also shows that the clamp unit includes a stroke cylinder 98 and related stroke piston 100. The stroke cylinder is connected to one platen (e.g. the stationary platen 50), whereas a remote end 102 of the piston 100 is coupled to the other platen. Conventionally, the stroke cylinder 98 is operationally responsive to the machine controller 88. According to a preferred embodiment, the stoke cylinder includes a pressure sensor 99 arranged to measure (and report to the machine controller 88) an internal pressure within the stroke cylinder 98 during machine stroking. The internal pressure, as will be appreciated, can be related to applied stroke force and hence also to acceleration of the platen. For purposes and representation only and for the reasons of simplicity and clarity, only a single stroke cylinder is shown in the drawing.

The location of the stroke cylinder 98 has an impact in relation to resultant tilting caused by actuation of the stroke cylinder. While the stroke cylinder 98 and related piston 100 are shown to be attached at the top of the clamp unit, the stroke cylinder 98 could be located somewhere else (subject to space consideration and effective operation).

Compensation of sagging from mold weight can be implemented independently of tilting induced by mold stroke forces. While it is preferable that the system provides a total solution, system simplification can be achieved by only addressing one of these aspects of horizontal misalignment; this would also save costs (e.g. by eliminating the need to measure stroke cylinder pressures).

Figure 4:
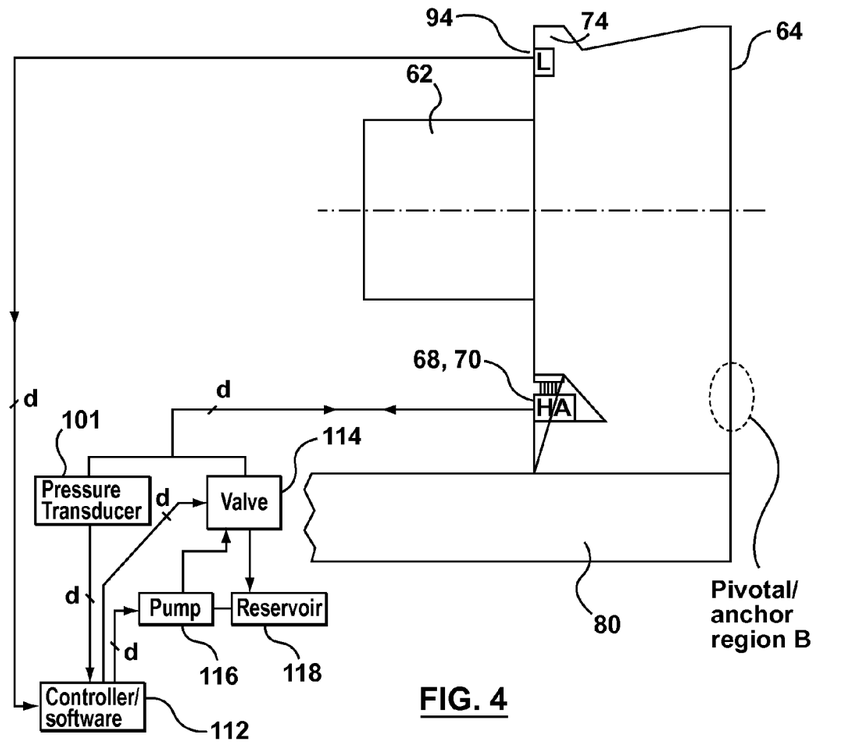
FIG. 4 is functional representation of a preferred anti-tilt actuator circuit within FIG. 3.

FIG. 4 is functional representation of an anti-tilt actuator circuit within FIG. 3. The anti-tilt circuit functions to provide an automatic correction to instantaneous changes in alignment of the mold halves arising from sagging and/or tilting events. In contrast to an alternative solution of extending the front wall of the platen or providing a specifically sized and manually adjustable support wedge, the preferred embodiment permits controlled variation of the hydraulic pressure within the cylinder to compensate for the variation in tilting moments arising from and stroke cylinder forces and mold halves having different masses. While the compensation can be continuous throughout the entire cycle, it is also acceptable to provide an averaged amount of compensation that improves (i.e. reduces) overall sagging or addresses effective mold tilt at a decisive point in the machine cycle, e.g. at platen stroking.

To maintain the benefit of a front wall 74 of the platen not being permanently affixed to the foot extension, it is contemplated that a slidable support in the hydraulic actuator permits this front wall to remain free-floating (relative to the rear wall) but supportive of the front wall/face. Clearly, in a conventional box section platen, this slidable support is not necessary and a permanent physical connection can be made by the hydraulic actuator between the clamp base 80 and the platen. Therefore, in both platen configurations, the uplifting force from the mold support structure (e.g. the hydraulic actuator) acts directly into and preferably under the front wall of the platen, thereby countering deformation and resulting misalignment between the mold halves/platens.

In terms of the controlled operation of the hydraulic actuator 68, 70, a level sensor 94 on the platen face communicates information/sensed data (d) to the machine controller 88 for interpretation by the control software 112. A valve 114, operationally responsive to the level sensor 94, is coupled between the hydraulic actuator 68, 70 and either a pump 116 or reservoir 118. In response to a measured level, the control software 112 actuates the valve to either pump fluid into or drain fluid from a piston housing with the hydraulic cylinder. Consequently, based on microprocessor control, a piston in the hydraulic actuator can either extend or relax to provide continuing alignment between the molds/platens.

Control of the mold support structure (hydraulic cylinder) by control of the pressure in the cylinder can be achieved both on a static basis (i.e. at initial set-up only) or a dynamic basis. In a static environment, at machine set up, the HMI 90 is used to program a pressure compensation that counteracts for platen tilting under mold weight. To establish an appropriate cylinder pressure, direct data entry of the weight of the mold is possible, but it is equally possible that the machine controller consults a look-up table based on a given mold identity. The look-up table (not shown) then sets the pressure in the cylinder directly. Of course, manual setting of the piston pressure is also possible through inspection and level measurements. For example, the piston pressure can be adjusted until there is substantially no shaking of the mold at closing. As will be appreciated, shaking is reflective of misalignment. A level of horizontalness could also be achieved by taking a simple spirit level relative to the mold face, with the piston pressure (in the hydraulic cylinder) merely adjusted until a satisfactory (empirically observed) measure is achieved.

In a dynamic adjustment environment, based on either a measured stroke force pressure or measured verticality of the platen, hydraulic pressure in the cylinder is adjusted. As will be appreciated, the effective stroke cylinder pressure is proportional to the applied horizontal force acting through the centre-line of the machine, with this creating the tilting moment acting on the platen.

In one particular embodiment, the stroke force is offset by the hydraulic force in the weight and level compensating hydraulic actuator 68, 70, with the machine controller sensing the horizontalness (or, alternatively, verticality) of platen face and adjusting the pressure to achieve an acceptable horizontalness (or verticality).

In another embodiment, based on location measurements of the stroke piston and the diameter of the stroke cylinder, software 112 in the machine controller 88 provides a calculated pressure profile to the cylinder of the hydraulic actuator 68, 70 to compensate for inertial and momentum effects experienced by the mold-platen assembly with acceleration and deceleration. In this case, there is no instantaneous measurement required, since all compensation calculations are determined in advance and pre-programmed into the machine controller. Such non-active measurement is possible because the effect of the force applied by the stroke cylinders does not change independently on mold weight.

In a fully active and dynamic environment, a preferred operating mechanism provides uplift by the hydraulic actuator 68, 70 based on effective pressure applied by the stroke cylinders. Based on stroke cylinder pressure measurements, the software 112 calculates: i) an effective tilting moment caused by the stroke cylinder (preferably relative to the centre line of the injection molding machine); ii) a substantially neutralising moment required to be applied to be platen by the anti-tilt actuator. In a particular embodiment, it is conceived that the bending and anti-tilt moments can be calculated based on Finite Element Analysis (FEA). In this respect, the operation of the complete hydraulic actuator circuit can be summarized as being that of an inertia compensator acting to substantially maintain horizontalness and alignment at all times during the cycle.

The various embodiments can therefore be used to compensate for variable mold weights used in the machine system during the operational lifespan of the system.

Figure 5:
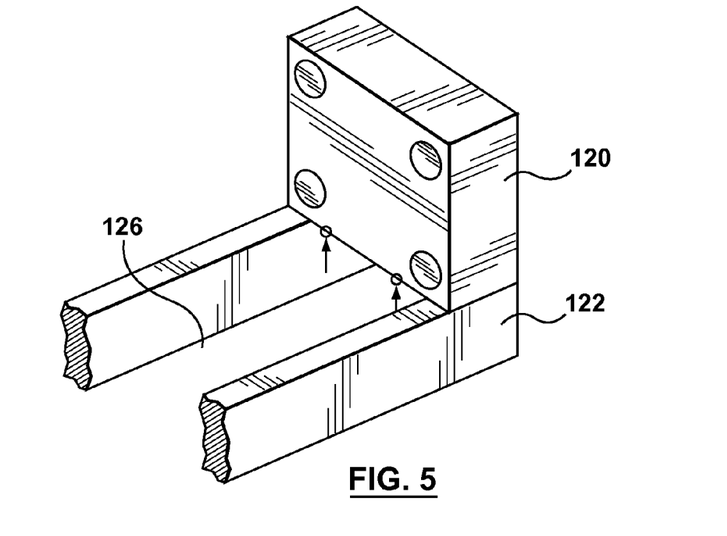
FIG. 5 is a schematic representation of the anti-tilt actuator of FIG. 4 retrofitted to a conventional box-section platen.

FIG. 5 is a schematic representation of the anti-tilt actuator of FIG. 4 retrofitted to a conventional box-section platen 120 mounted on a clamp base 122. The operation of the anti-tilt actuator is as previously described in relation to FIG. 4.

Figure 6:
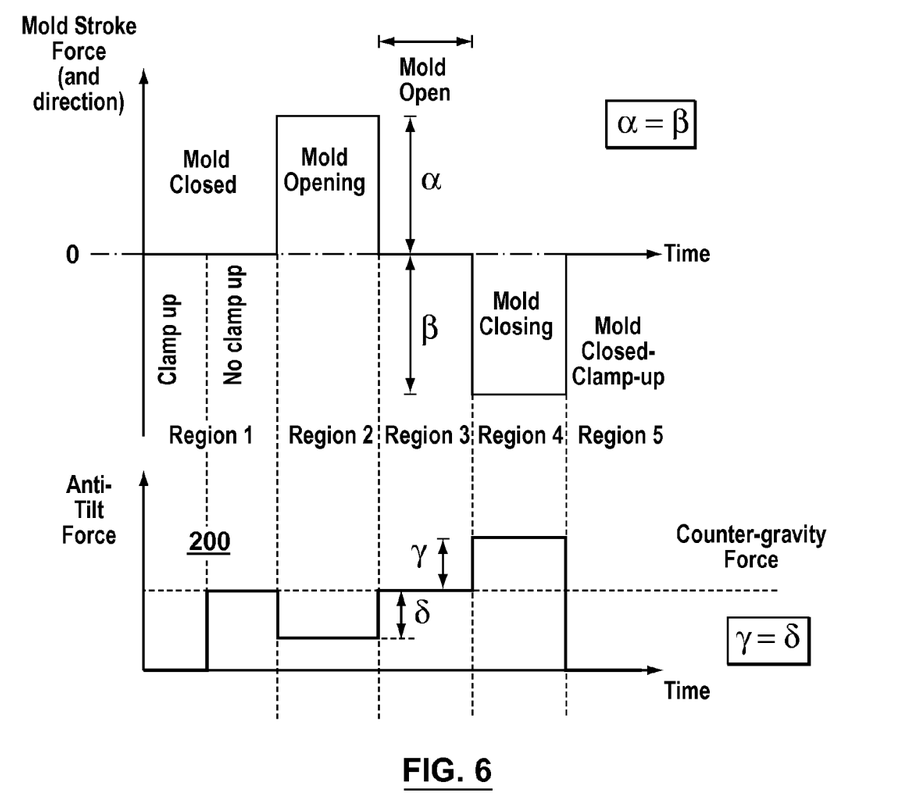
FIG. 6 is an explanatory force diagram illustrating a relationship between gravity and mold stroke forces and applied anti-tilt force according to a particular aspect of the present invention.

FIG. 6 is an explanatory force diagram that illustrates a relationship between mold stroke force ("α" and "β")—and applied anti-tilt force (anti-tilting compensation profile 200) for the stationary platen over time and in accordance with a particular embodiment of the present invention. Considering the combined weight of a platen and its attached mold half assembly in an initial "mold closed" position, in a stationary state of zero movement the platen and mold half are clamped up. Gravity effects and shearing forces have no effect on alignment. The mechanical support (anti-tilt force) offered by the hydraulic actuator 68, 70 is therefore not necessary nor desirable; this is shown in "Region 1".

As soon as the clamp-up force is reduced, the hydraulic anti-tilt actuator 68, 70 is pressurized to prevent tilting and sagging of the mold. When the stroke cylinders begin to accelerate the moving platen, their reaction force acts through the machine centre line onto the stationary platen; this results in the upper portion of the platen effectively tilting backwards. The tilting moment acting on the stationary platen is therefore effectively reduced and the anti-tilt force (applied by the hydraulic actuator 68, 70) can be reduced (see "σ" in Region 2). Following some perturbations and at zero acceleration but some velocity, the hydraulic actuator 68, 70 again operates to simply compensate for gravity effects (Region 3).

As the platen is brought towards the mold closed position, the stroke cylinder force now cause the stationary platen to experience an increase in sagging/deflection (caused by inertial effects). Consequently, the machine controller 88 and associated control software 112 increases pressure in the hydraulic actuators 68, 70 and thus increase the applied anti-tilt force (see "γ" in Region 4).

As the platen is brought towards the mold closed position, the stroke cylinder force now cause the stationary platen to experience an increase in sagging/deflection (caused by inertial effects). Consequently, the machine controller 88 and associated control software 112 increases pressure in the hydraulic actuators 68, 70 and thus increase the applied anti-tilt force (Region 4).

Finally, at clamp up, the tilting from the stroke force and gravitational sagging is essentially nothing, since the mold halves are then locked together and the pressure in the anti-tilt cylinders is set to zero to prevent cylinder overloading due to compression of the cylinder from platen body deflection.

It will be understood that the representation shown in FIG. 6 is simplistic and used to explain the principle of operation. Rather than seeing discrete, stepwise transitions in applied anti-tilt force, the hydraulic actuator applies a smooth anti-tilt compensation profile 200 that counteracts an occurring variable sum of tilting moments from mold weights and stroke cylinder force.

The location of the hydraulic actuators is preferably located close to or beneath the front edge of the mold mounting face of the platen. Equally, while the hydraulic actuators are shown to be connectable between the underside of the platen and the clamp unit, this is merely a preferred arrangement. The actuators on the stationary platen could equally well be installed relative to the floor, or the hydraulic actuators 68, 70 could equally be attached to the side of the platen or the mold half. Similarly, while it is desirable to limit the number of actuators (because of costs and space constraints), the number of anti-tilt actuators are number from one (that is centrally located beneath the platen) to two or more that are preferably equally spaced either towards the lower edges of the platen or across the width of the platen. However, it is preferred that two actuators are employed for each platen.

Figure 7:
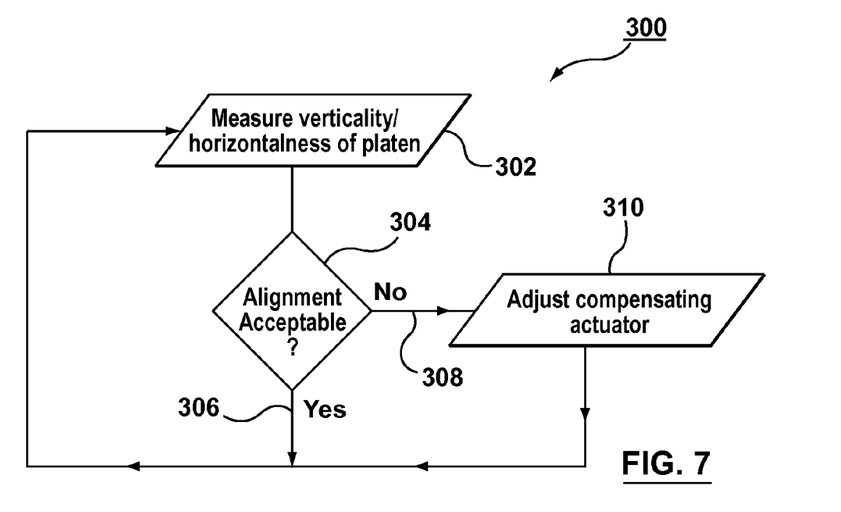
FIG. 7 is a flow diagram showing a control loop implemented with the various embodiments of the present invention.

Referring briefly to FIG. 7, a flow diagram 300 of a control loop implemented with the various embodiments of the present invention is shown. At step 302, a measure is made as to whether the platen is in vertical/horizontal alignment; the choice of level measurement is arbitrary and therefore subject to design freedom. At step 304, an assessment is made as to whether either the effective alignment (relative to the other mold half or platen) or level of the platen (including its mounted mold half) is acceptable. In the affirmative 306, the control loop returns to the measuring process (which could, for example, be implemented either on a micro-second basis or just occasionally, e.g. at mold installation or mold test). In the negative 308, either manual adjustment or control software executes a compensating event 310 to substantially attain an acceptable level of horizontalness/alignment of the platen-mold sub-assembly. The compensation event can be either a positive or negative up-lift relative to an acceptable datum level.

Figure 8:
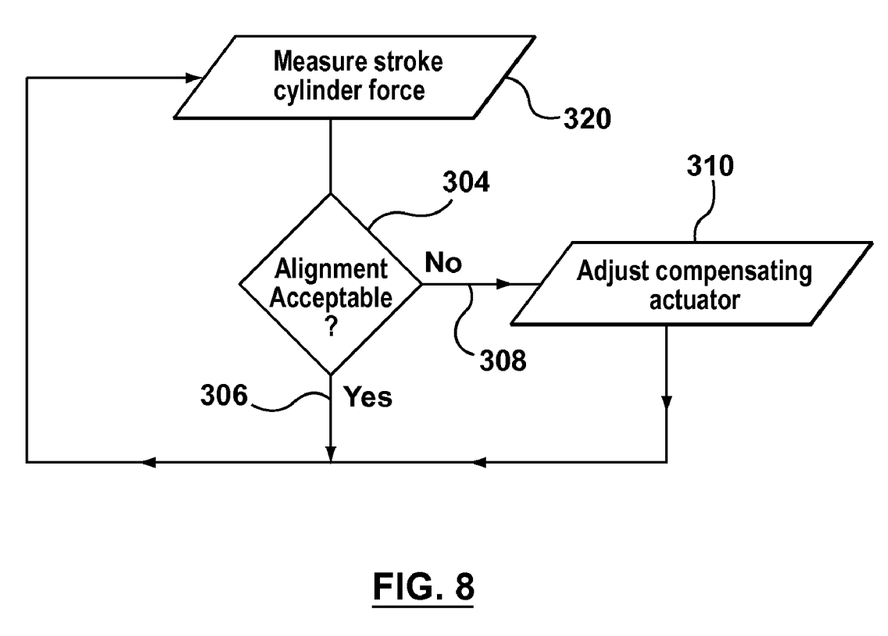
FIG. 8 is a flow diagram showing an alternative control loop implemented with the various embodiments of the present invention.

In relation to FIG. 8, an alternative control loop (to that of FIG. 6) is shown. Essentially, the only difference is the control loop is that stroke cylinder force is measured 320 and the compensation event 310 by the actuator (in whatever physical form this takes) is achieved through dynamic control of the anti-tilt actuator.

In relation to FIG. 8, an alternative control loop (to that of FIG. 6) is shown. Essentially, the only difference is the control loop is that stroke cylinder force is measured 320 and compensation by the actuator (in whatever physical form this takes) is achieved through dynamic control of the anti-tilt actuator.

Of course, it is contemplated that the control loops of FIGS. 7 and 8 (i.e. the use of measured stroke cylinder pressure and measured verticality/horizontalness) can be used in a complementary sense to provide a finer degree of overall control of platen mold alignment, thereby reducing the effects of mold sagging/tilting.

While a preferred embodiment of the present invention details the use of a hydraulic piston as the anti-tilt levelling actuator, the choice of levelling actuator is subject to design freedom, e.g. mechanical actuators are equally suitable. The only issues concerning the selection of suitable levelling actuator are that each device should be able: i) to compensate for the sagging and tilting of a heavyweight platen and mold combination; ii) to be controllable and scalable (to support different mold weight and different measured uplifts); and iii) in an adaptive environment, to be sufficiently quickly acting to permit complementary pressure adjustment to achieve substantially continuous level stability.

It will, of course, be appreciated that the above description has been given by way of example only and that modifications and variations will be readily apparent to the skilled exponent without departing from the scope of the appended claims. For example, while the preferred embodiment has been described in the context of 2-platen injection molding environment, the present invention can find application in a multi-mold machine (such as a Tandem® injection mold machine) in which at least one centre-section carrier has opposed mold mounting faces that complementarily face stationary and moving platens. Equally, the concepts of the present invention, while described in the context of a plastic injection molding machine platen, are widely applicable to all platens (in all environments, e.g. metal (thixo) molding) that are subject to turning moments, especially when these turning moments arise from a platen face that is generally free or "floating". The solution provided by the present invention is therefore generally applicable to platen environments where momentum and/or bending moments can cause platen tilting and misalignment problems.

The invention claimed is:

1. A platen assembly for use in a molding machine, the platen assembly comprising:
   a) a platen having a front face arranged to mount, in use, a mold half thereon to produce, in an operational environment, a mold-platen sub-assembly that is potentially affected by sagging and tilting related to at least one of an overall mass thereof, its centre of gravity, inertia effects arising from movement of the mold-platen sub-assembly and a structural configuration of the platen; and
   b) an anti-tilt apparatus coupled to the platen, the anti-tilt apparatus having:
      an actuator controllable in response to at least one of: i) a measured inclination of the platen; and ii) a tilting moment acting on the platen; the actuator generating a compensating up-lift that acts to substantially horizontally align the mold-platen sub-assembly by compensating for sagging and bending effects caused by at least one of the overall mass, the centre of gravity, the inertia effects arising from movement of the mold-platen sub-assembly and the structural configuration of the platen; and
      wherein the actuator is operable to act under the front face of the platen to generate the compensating up-lift at any position of the mold-platen sub-assembly during its movement between an open and a closed position.

2. The platen assembly according to claim 1, wherein the anti-tilt apparatus includes a level sensor locatable, in use, on one of the platen and the mold half.

3. The platen assembly according to claim 1, wherein the anti-tilt apparatus includes a pressure sensor for associated control of a stroke cylinder.

4. The platen assembly according to claim 1, wherein the platen has a front, mold mounting wall, a rear wall connected to the front wall and a cone-shaped intermediate support structure connecting the rear wall to the front wall, the front wall being free-floating with respect to the rear wall.

5. The platen assembly according to claim 1, wherein the anti-tilt apparatus includes a hydraulic actuator operationally responsive to a control circuit controlled by software.

6. The platen assembly according to claim 1, wherein the actuator is a mechanical actuator.

7. A molding system comprising:
   a clamp base;
   a clamp unit located on the clamp base and including at least one platen mounted thereon, the platen having mounted thereon a mold half; and
   an anti-tilt apparatus coupled to the platen, the anti-tilt apparatus having:
      an actuator controllable in response to at least one of a measured inclination of the platen and a tilting moment associated with the platen, the actuator generating a compensating up-lift that acts to substantially horizontally align the platen by compensating for sagging and bending effects caused by at least one of: i) an overall mass of the platen and mold; ii) a centre of gravity for the platen and mold; iii) inertia effects arising from movement of the platen; and iv) structural configuration of the platen and
   wherein the actuator is operable to generate the compensating up-lift at any position of the platen during its movement between an open and a closed position, the actuator acting under the front face of the platen.

8. The molding system according to claim 7, wherein the actuator has a first end connectable to the platen and a second end coupled to one of:
   the clamp base; and
   a foot extension of the platen; and
   floor/level ground.

9. The molding system according to claim 7, wherein the anti-tilt apparatus includes a level sensor located on at least one of the platen and the mold half.

10. The molding system according to claim 7, wherein the anti-tilt apparatus includes a pressure sensor for associated control of a stroke cylinder.

11. The molding system according to claim 7, wherein the platen has a front, mold mounting wall, a rear wall connected to the front wall and a cone-shaped intermediate support structure connecting the rear wall to the front wall, the front wall being free-floating with respect to the rear wall.

12. The molding system according to claim 7, wherein the system includes a machine controller containing control software and the anti-tilt apparatus includes a hydraulic actuator operationally responsive to the control software in the machine controller.

13. The molding system according to claim 7, wherein the anti-tilt apparatus functions to provide automatic correction to changes in alignment of the mold halves arising from sagging and tilting events.

14. The molding system according to claim 7, wherein the system includes stroke cylinders coupled to the platen and the clamp unit, the stroke cylinders arranged to affect selective opening and closing of the mold halves, wherein the anti-tilt apparatus functions to provide automatic correction to instantaneous changes in alignment of the mold halves arising from forces applied by the stroke cylinders.

15. The molding system according to claim 7, wherein compensating up-lift is applied continuous throughout an injection molding cycle performed by the molding system.

16. The molding system according to claim 7, wherein compensating up-lift is applied in accordance with an averaged amount of required compensation that improves overall alignment of the mold halves at a decisive point an injection molding cycle.

17. The molding system according to claim 7, wherein compensating up-lift is applied periodically, but not during a full machine cycle.

\* \* \* \* \*